United States Patent [19]

Berney

[11] 4,439,717

[45] Mar. 27, 1984

[54] CONTROL DEVICE FOR A STEPPING MOTOR

[75] Inventor: Jean-Claude Berney, Epalinges, Switzerland

[73] Assignee: U.S. Philips Corporation, New York, N.Y.

[21] Appl. No.: 345,951

[22] Filed: Feb. 4, 1982

[30] Foreign Application Priority Data

Feb. 4, 1981 [CH] Switzerland .......................... 725/81

[51] Int. Cl.[3] .............................................. H02K 29/04

[52] U.S. Cl. .................................... 318/696; 318/685; 368/157

[58] Field of Search ................ 318/696, 685; 368/157, 368/159, 200, 76

[56] References Cited

U.S. PATENT DOCUMENTS 3,812,670 5/1974 Nikaido et al. ...................... 368/159

4,323,834 4/1982 Xuan et al. .......................... 318/696

*Primary Examiner*—G. Z. Rubinson

*Assistant Examiner*—Saul M. Bergmann

*Attorney, Agent, or Firm*—Robert T. Mayer; Bernard Franzblau

[57] ABSTRACT

A control device for a stepping motor provided with a coil and a rotor performing a rotary movement when a current passes through the coil, comprising means for producing a plurality of time base signals, means for producing pulses for controlling the motor in response to said time base signals, means responsive to the control pulses for supplying the motor while maintaining the current in the coil at a substantially constant and given value. The device also comprises means for analyzing the voltage signal present on the coil or a signal which is representative thereof, and for supplying data concerning the voltage induced in the coil by the rotor movement. The motor supply means may include switching means for connecting the coil to a supply voltage source and for short-circuiting the coil, and means for periodically comparing the coil current to a reference value, during each control pulse, and supplying a control signal for controlling the switching means to short-circuit the coil when a comparison indicates the current exceeds the reference value, and to apply voltage to the coil in the opposite case, until the following comparison operation. This maintains the mean value of the current at a reference value during the control pulses to provide a high-efficiency power supply system. At the coil terminals logic information is derived concerning the induced voltage which can be easily analyzed and used by logic circuits.

33 Claims, 10 Drawing Figures

CONTROL DEVICE FOR A STEPPING MOTOR

BACKGROUND OF THE INVENTION

The present invention concerns control devices for stepping motors.

In stepping motors, the analysis of the voltage induced in the motor coil by the movement of the rotor makes it possible to ascertain the performance of the motor at the moment at which it performs a stepping motion. Such analysis may be useful both with regard to producing circuits for monitoring and controlling the motor, in particular those circuits which make it possible to adapt the duration of the driving pulses applied to the motor to the load it drives, and also with regard to equipment for measuring parameters of the motor, such as the working torque, current consumption, etc. or for monitoring proper operation of the motor.

Now, most stepping motors, more particularly those used in the timepiece industry, are supplied with fixed-voltage driving pulses. During these driving pulses, measurement of the induced voltage can then be effected only indirectly, by analysing the current in the coil. This operation is a delicate one, by virtue in particular of the influence of the self-inductance of the coil itself, which has a substantial inductance value and which opposes the variations in current resulting from the presence of the induced voltage, thereby disturbing the measurement.

Another disadvantage from which the known control devices suffer is due to the fact that, if the voltage of the supply source to which the coil is connected in the course of the driving pulses varies, the power applied to the motor also varies. Operation of the motor is therefore affected by the variations that may occur in the electromotive force and the internal resistance of the power source, as is the case in timepieces where the motor may be supplied by batteries, the voltage of which varies in dependence on time and from one type to another.

OBJECT OF THE INVENTION

It is an object of the present invention to provide a control device for a stepping motor, which, during the duration of the driving pulses applied thereto, is capable of supplying precise information concerning the voltage induced in the coil by the movement of the rotor.

The invention also seeks to provide a control device which makes it possible for operation of the motor to be rendered independent of the supply voltage over a wide range.

SUMMARY OF THE INVENTION

In accordance with the invention, the control device for a stepping motor, provided with a coil and a rotor performing a rotary movement when a current passes through the coil, comprises means for supplying a plurality of time base signals, means for producing pulses for controlling the motor in response to at least a part of said time base signals, means responsive to the control pulses for supplying the motor while maintaining the current in the coil at a substantially constant and given value during the control pulses, means for taking off a signal representative of the voltage signal present on the coil, and analysis means for supplying, from the signal representative of the voltage signal, data concerning at least the voltage induced in the coil by the movement of the rotor.

The analysis means may also be designed to supply data concerning the voltage value at the terminal of the resistance of the coil.

Moreover, it is possible to provide the control device with additional circuits for determining, on the basis of the data supplied by the analysis means, other parameters relating to the conditions of operation of the motor, such as the power consumed during a step movement.

The various results can then be used to govern the control circuit of the motor in such a way as to reduce the power consumption thereof, for example by interrupting the driving pulse when the rotor has performed its step or controlling the duration of the driving pulse in dependence on the variations in the load on the motor. It is also possible for example to determine if a step movement has not been carried out, and to correct that error by supplying an additional high-powder driving pulse to force the rotor to perform its step.

Besides the fact that it makes it possible to attain the main objects sought, that is to say, the possibility of directly obtaining data concerning the voltage induced by the rotor movement, without having to go through analysis of the current, and independence of the operation of the motor with respect to the parameters of the power source, which is a highly attractive consideration in uses such as in timepieces, the constant-curent supply also has the advantage of making it possible to reduce the number of turns on the coil, and thus to increase the diameter of the wire in consequence, hence providing an attractive saving on the cost of the coil.

However, in order to be able to use such a power supply method in portable, autonomous equipment of small size such as watches, it is necessary to provide a high-efficiency power supply device.

It is not possible for example to supply the motor with pulses at high voltage through a high-value current limiting resistor.

The invention also makes it possible to arrive at a solution to that problem, by providing a control device for a stepping motor, wherein the means for supplying the motor, which comprise switching means for connecting the coil to a voltage supply source and for short-circuiting said coil, also comprise means for periodically comparing the current in the coil to a reference value, during each control pulse for the motor, and producing a control signal for controlling the switching means in order to short-circuit the coil when, in a comparison step, the current exceeds the reference value, and to supply voltage to the coil if the current is below said reference value, that being effected until the following comparison step, so as to maintain the mean value of the current at the reference value during the control pulses.

The reference value may be made dependent on the threshold voltage of an MOS transistor which is independent of the supply voltage.

It is also possible to program that reference value by using current sources which can be switched and combined together.

The voltage at the coil terminals, during the control pulses, thus comprises a series of supply periods and of short-circuit periods which forms a logic data representative of the induced voltage.

Analysis of that data or of a signal which constitutes the image thereof, such as the control or monitoring signal for controlling the switching means, can then be carried out by means of circuits which are of an entirely logic nature, which is an advantage additional to the advantage of the high level of efficiency that can be achieved by means of such a switched power-supply system.

Moreover, the signal at the coil terminals may be detected either by a galvanic connection to a terminal of the motor, or without contact, for example inductively by a detector or pick-up coil, and analysed by circuits which are external to the control device. This makes it possible to determine the parameters relating to the operation of the motor without any intervention into the interior of the control device, which is a particularly attractive consideration from the point of view of checking or control operations in the course of or at the end of manufacture and when carrying out repairs.

BRIEF DESCRIPTION OF THE DRAWINGS

The invention will now be described in greater detail by way of example and with reference to the accompanying drawings in which.

DETAILED DESCRIPTION OF PREFERRED EMBODIMENTS

Figure 1:
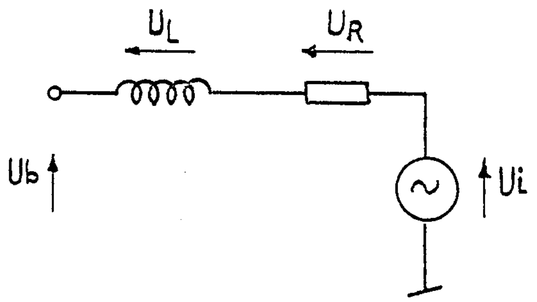
FIG. 1 shows the equivalent electrical diagram of a stepping motor of known type.
Figure 2:
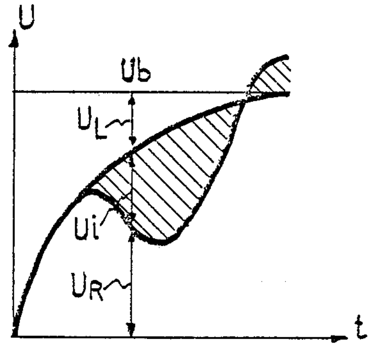
FIG. 2 shows the voltages in FIG. 1 in the case of a constant-voltage supply.
Figure 3:
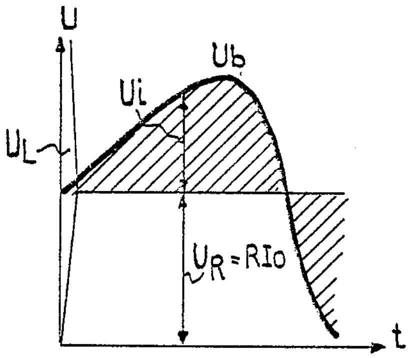
FIG. 3 shows the voltages in FIG. 1 in the case of a constant-current supply.

FIG. 1 shows the equivalent electrical diagram of a single-phase bipolar stepping motor of Lavet type which is generally used in time-pieces. FIG. 2 shows the voltages in FIG. 1 for constant-voltage driving pulses while FIG. 3 shows the curves of the voltages in FIG. 1 for constant-current driving pulses. This type of motor essentially comprises a self-inductance, a coil resistance means and a voltage generator, at the terminals of which there are respectively the self-induction voltage $U_L$, the resistance voltage $U_R$ and the voltage Ui which is induced in the coil by the movement of the rotor. The total of those three voltages is equal to the voltage Ub at the terminals of the coil.

When the motor is supplied under constant-voltage conditions, it is the current which is variable. FIG. 2 shows the three voltages $U_L$, Ui and $U_R$ during the driving pulse.

With the current being variable, those three voltages are variable, and the value of Ui can be ascertained only by determining the variables $U_R$ and $U_L$. On the other hand, when the motor is supplied under constant-current conditions (see FIG. 3), the component $U_L$ Is eliminated as soon as the current reaches the reference value (constant) and the component $U_R$ becomes constant and equal to RIo, Io being the current in the coil. The voltage at the terminals of the coil is equal to $U_R+Ui=Ui+\text{constant}$. The value of the constant $U_R$ can be measured at the beginning of the driving pulse, as soon as the current in the coil has reached the reference value Io. In fact, at that moment the speed of the rotor is still low and the value of the induced voltage Ui is negligible. It can therefore be assumed that $U_R \simeq Ub$.

Figure 4:
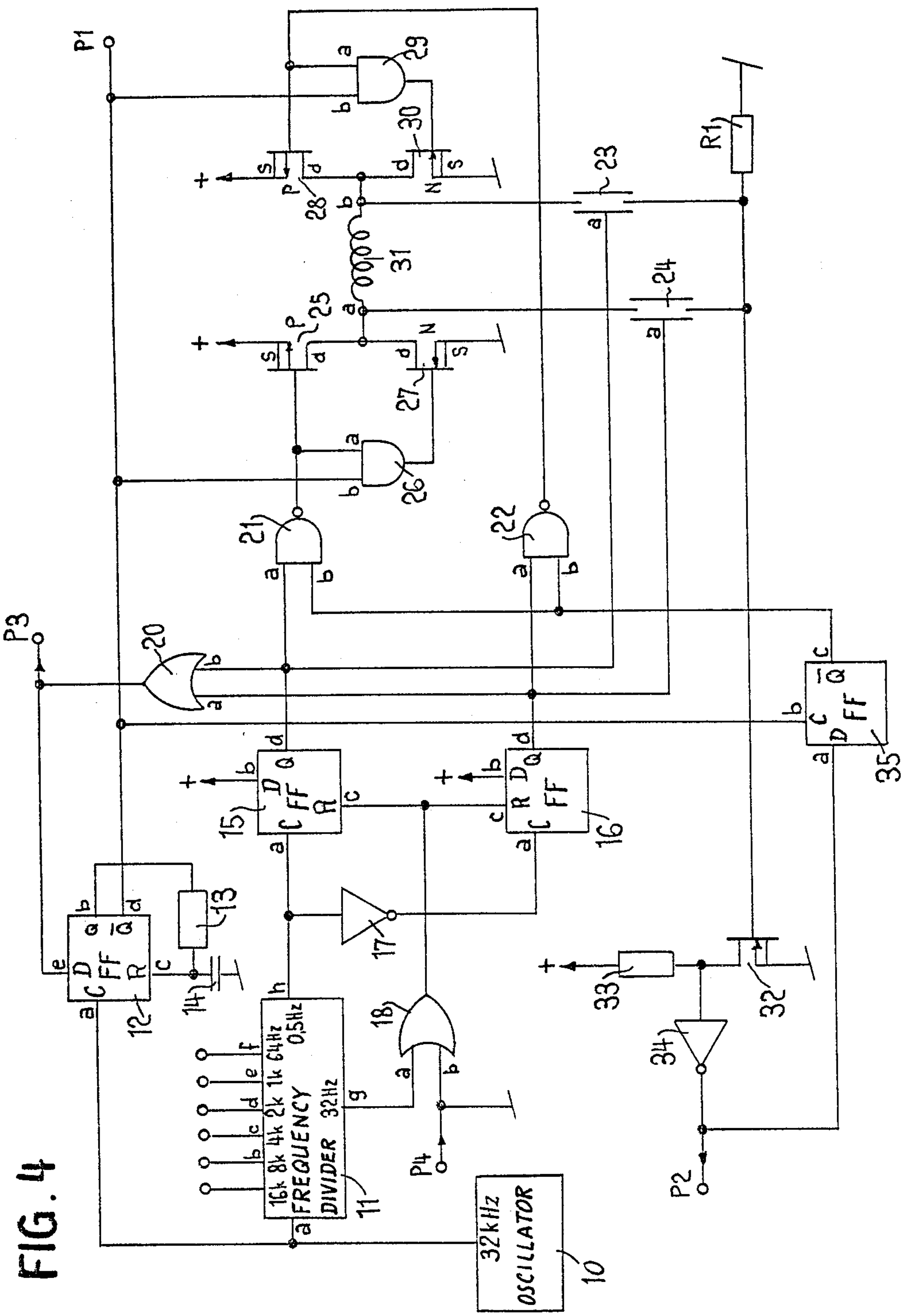
FIG. 4 shows the diagram of a control circuit according to the invention.

FIG. 4 shows by way of example the diagram of a control circuit of the device according to the invention, which makes it possible for the current in the coil to be maintained at a fixed value during the pulses for controlling the movement of the motor. A quartz oscillator 10 supplies a 32 kHz signal to the clock inputs a of a frequency divider 11 and to a D-type flip-flop 12 operating in a monostable mode. For that purpose, the output Q (b) of the flip-flop is connected by a resistor 13 to its reset input (c) and to a capacitor 14 which is connected to ground. Thus, whenever the flip-flop 12 goes to logic state "1", the capacitor 14 is charged through the resistor 13 and resetting occurs after a certain delay which is of very short duration (2 μs for example). The flip-flop 12 therefore produces fine pulses of a duration of 2 μs at a repetition frequency of 32 kHz when its input D (e) is at state "1".

THe divider 11 supplies signals at a frequency at 8 kHz at its output b, 4 kHz at its output c, 2 kHz at its output d, 1 kHz at its output e, 64 Hz at its output f, 32 Hz at its output g and 0.5 Hz at its output h. The latter is connected to the clock input a of a D-type flip-flop 15 and through an inverter 17 to the clock input a of another D-type flip-flop 16. The inputs D (b) of the flip-flops 15 and 16 are maintained in state "1" while their reset inputs (c) are connected to the output of an OR-gate 18, the input a of which is connected to the output g (32 Hz) of the divider 11. The flip-flops 15 and 16 deliver in turn pulses for controlling the movement of the motor, one on the positive edge of the 0.5 Hz signal at the output h of the divider 11 and the other at the negative edge of the same signal. It is the 32 Hz output (g) of the divider which, by way of the gate 18, effects resetting of the flip-flops 15 and 16 and thus determines the duration of the control pulses, namely 16 ms.

The outputs d of the flip-flops 15 and 16 are connected to the inputs b and a of an OR-gate 20, to the inputs a of two NAND-gates 21 and 22 and to the control inputs of two similar analog switches 23 and 24. The output of the gate 21 is connected to the gate of a P-MOS power transistor 25 and to the input a of an AND-gate 26, the output of which is connected to the gate of a N-MOS power transistor 27. The output of the gate 22 is connected to the gate of a P-MOS power transistor 28 and to the input a of an AND-gate 29, the output of which is connected to the gate of a N-MOS power transistor 30.

The source electrodes of the P-type transistors 25 and 28 are connected to the positive terminal of the electrical power source and the source electrodes of the N-type transistors 27 and 30 are connected to the negative terminal of the power source. The drains of the transistors 27 and 25 are connected to the terminal a of the coil of the motor 31 and the drains of the transistors 28 and 30 are connected to the terminal b of the coil. The power transistors 25,27,28 and 30 form a switching means either for connecting the coil to the terminals of the electrical power source or for short-circuiting the coil. Let it be assumed that the inputs b of the gates 21, 22,26 and 29 are at state "1". In the absence of pulses at the outputs of the flip-flops 15 and 16, the outputs of the gates 21,22,26 and 29 are at "1". The transistors 25 and 28 are switched off while the transistors 27 and 30 are in a conducting condition so that the coil is short-circuited.

When the flip-flop 15 produces a control pulse, the outputs of the gates 21 and 26 to to state "0". The transistor 27 is switched off and the transistor 25 becomes conducting, connecting the terminal a of the coil 31 to the positive terminal of the power source. Current flows through the coil in the direction a-b.

When the flip-flop 16 produces a control pulse, the outputs of the gates 22 and 29 go to state "0". The transistor 30 is switched off and transistor 28 becomes conducting, connecting the terminal b of the coil 31 to the positive terminal of the power supply. Current flows in the coil in the direction b-a. The motor is thus supplied with pulses of alternate polarity at the rate of one pulse per second, as in most of the known timepiece circuits.

When a pulse arrives at the output of the flip-flop 15, the switch 23 conducts so that a resistor R1 and the gate of a N-MOS transistor 32 are connected in parallel with the power transistor 30. On the other hand, the input D (e) of the D-type flip-flop 12 goes to state "1" and the latter supplies at its output $\overline{Q}$ (d) very fine negative test pulses of a duration of 2 μs at the frequency of 32 kHz, which are transmitted by the gate 29 to the gate of the transistor 30, thereby periodically switching the transistor 30 off for a very short time. As the current in the coil 31 can no longer flow through the transistor 30, it then passes through the resistor R1, causing a rise in the voltage at the gate of the transistor 32. If the current in the coil is at a sufficiently high level, the rise in voltage exceeds the conduction threshold of the transistor 32 ($V_T$) and the transistor conducts. A negative pulse appears at the drain of that transistor which is connected to a high-value resistor 33 which in turn is connected to the positive terminal of the power supply and to the input of an inverting amplifier 34, at the output of which positive pulses therefore appear. This circuit acts as a level discriminator for the current in the coil. In fact, when the current in the coil is higher than a fixed value ($Io = V_T/R1$), a signal appears at the output of the amplifier 34. On the contrary, if the current in the coil is below the fixed value, the conduction threshold of the transistor 32 is not reached and the output of the amplifier 34 remains in the state "0". It can be noted that this conduction threshold, namely the threshold voltage of the transistor 32, is independent of the supply voltage. Accordingly, the level of discrimination of the current, $V_T/R1$, is itself independent of the supply voltage of the motor.

The output of the amplifier 34 is connected to the D input (a) of a D-type flip-flop 35, the clock input (b) of which is connect to the $\overline{Q}$ output (d) of the flip-flop 12 supplying the negative test pulses. At the end of each test pulse, the flip-flop 35 stores the state of its D input, that is the state of the output of the amplifier 34, which depends on the level of current in the coil.

If that current is higher than the fixed value, the output of the amplifier 34 is at state "1" and the $\overline{Q}$ output (c) of the flip-flop 35 goes to state "0". Inversely, if the current in the coil is below the fixed value, the output of the amplifier 34 remains at state "0" and the $\overline{Q}$ output (c) of the flip-flop 35 goes to state "1". The $\overline{Q}$ output (c) is connected to the input b of the NAND-gate 21, the output of which remains at "0" if the $\overline{Q}$ output (c) of flip-flop 35 remains at state "1" but which on the other hand goes to state "1" if the output goes to state "0", thereby switching off the transistor 25 and causing the transistor 27 to conduct. Thus, the supply of power to the coil is interrupted and the short-circuit is re-established at its terminals whenever the output c of the flip-flop 35 is at state "0", that is whenever the discriminator produces a signal corresponding to the condition where the current in the coil is higher than the fixed value. Inversely, whenever the output of the discriminator remains at state "0", which corresponds to the condition where the current in the coil is below the fixed value, the output c of the flip-flop 35 goes to state "1" and the supply of power to the coil 31 by the transistor 25 is re-established, with the transistor 27 being switched off.

When the control pulse arrives at the output of the flip-flop 16, the process is substantially the same. This time, it is the switch 24 which conducts and the resistor R1 is connected in parallel to the transistor 27 which is periodically interrupted during very short moments of time by the test pulses coming from the gate 26 and supplied by the $\overline{Q}$ output (d) of the flip-flop 12. The gate 22, the input b of which is connected to the $\overline{Q}$ output (c) of the flip-flop 35 either permits the motor coil to be supplied with power by the transistor 28, or permits it to be short-circuited by the transistor 30, depending on the state of the output c of the flip-flop 35, which state depends on the level of the current in the coil. This therefore provides a regulation of the current in the motor coil during the control pulses, and that regulation tends to maintain that current constant and equal to the fixed value, $Io = V_T/R1$. The coil is supplied with power in a switched mode by a plurality of short-duration pulses followed by an equal number of short-circuits. It could be thought that the variations in the current in the coil between the supply and short-circuit phases are substantial. However, it should not be forgotten that stepping motors have a substantial series self-induction. This self-induction acts as a current regulator and makes it possible for the current in the coil to be maintained in the region of the fixed value, even during the short-circuit periods. The theory of this type of power supply is as follows:

The voltage Ub at the terminals of the coil is given by $$Ub = U_L + U_R + Ui = L\frac{di}{dt} + U_R + Ui \quad (1)$$

$$\frac{di}{dt} = \frac{Ub - (U_R + Ui)}{L} \quad (2)$$

in which L is the self-induction of the coil 31.

When the coil is supplied with power, the voltage Ub is equal to the supply voltage V:

$$\frac{di+}{dt} = \frac{V - (U_R + Ui)}{L} \quad (3)$$

When the coil is short-circuited, the voltage Ub is equal to 0:

$$\frac{di-}{dt} = -\frac{(U_R + Ui)}{L} \quad (4)$$

Because the coil is supplied with a constant current, the sum of the variations (3) and (4) must be zero:

$$\frac{di^+}{dt} n^+ t + \frac{di^-}{dt} n^- t = 0, \quad \text{or} \tag{5}$$

$$\frac{V - (U_R + Ui)}{L} n^+ t - \frac{(U_R + Ui)}{L} n^- t = 0$$

in which t=test period (~30 μs)

$n^+$ = number of periods of supply to the coil $n^-$ = number of periods of short-circuiting of the coil, with $n=n^+ + n^-$.

From (5), the following is calculated:

$$\frac{n^+}{n^+ + n^-} = \frac{n^+}{n} = \frac{U_R + Ui}{V} \tag{6}$$

The mean voltage Ub, at the coil, is given by:

$$\overline{Ub} = \frac{n^+}{n} V = U_R + Ui \tag{7}$$

The mean current consumption Ic at the power supply, is given by:

$$Ic = Io \frac{n^+}{n} = \frac{Io}{V} \overline{Ub} \tag{8}$$

in which Io=constant current in the coil.

The relationship (7) is interesting; it shows that the mean value of the voltage across the terminals of the coil, as represented by a series of pulses of short duration, with interposed short-circuits, is equal to the sum $U_R$+Ui.

The signal at the output c of flip-flop 35, which consists in a succession of logic states "1" and "0", is representative of the mean voltage $\overline{Ub}$ applied to the coil. A same signal is present on the terminals of the coil 31. It may be called "control signal".

Suitable analysis of this succession of logic states therefore makes it possible to find $U_R$ and Ui, as will be seen hereinafter, and to deduce therefrom certain important parameters relating to the operation of the motor.

Although the current Io in the coil is constant, the mean current Ic delivered by the power supply is variable since Io does not go through the supply except during the periods of power supply to the coil. Relation (8) shows that Ic is proportional to $\overline{Ub}$, that is to say, to the sum $U_R$+Ui.

Figure 5A:
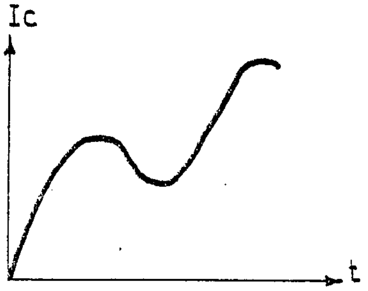
FIG. 5 shows the current consumed by the motor, respectively when using a constant-voltage supply (5*a*) and a constant-current supply (5*b*)

FIG. 5 shows a comparison between the form of current Ic delivered by the power supply in the case (5*a*) where the coil is supplied at constant voltage in the case (5*b*) where the coil is supplied with constant current by the device according to the invention.

In the former situation, the current Ic falls when the induced voltage rises and vice-versa. The current at the end of the control pulse tends towards its maximum value.

In the second situation, the current Ic rises and falls with the induced voltage; the current at the end of the control pulse tends towards zero.

Finally, it should be noted that if Io is made independent of the supply voltage, which is possible by using an internal stabiliser, the motor is no longer affected by the variations in the voltage since the number of ampere-turns that it receives remains constant.

The motor can therefore be supplied with power by power supply sources the voltage of which varies in time, which is the case for example with lithium batteries, without modifying the working point of the motor.

Figure 6:
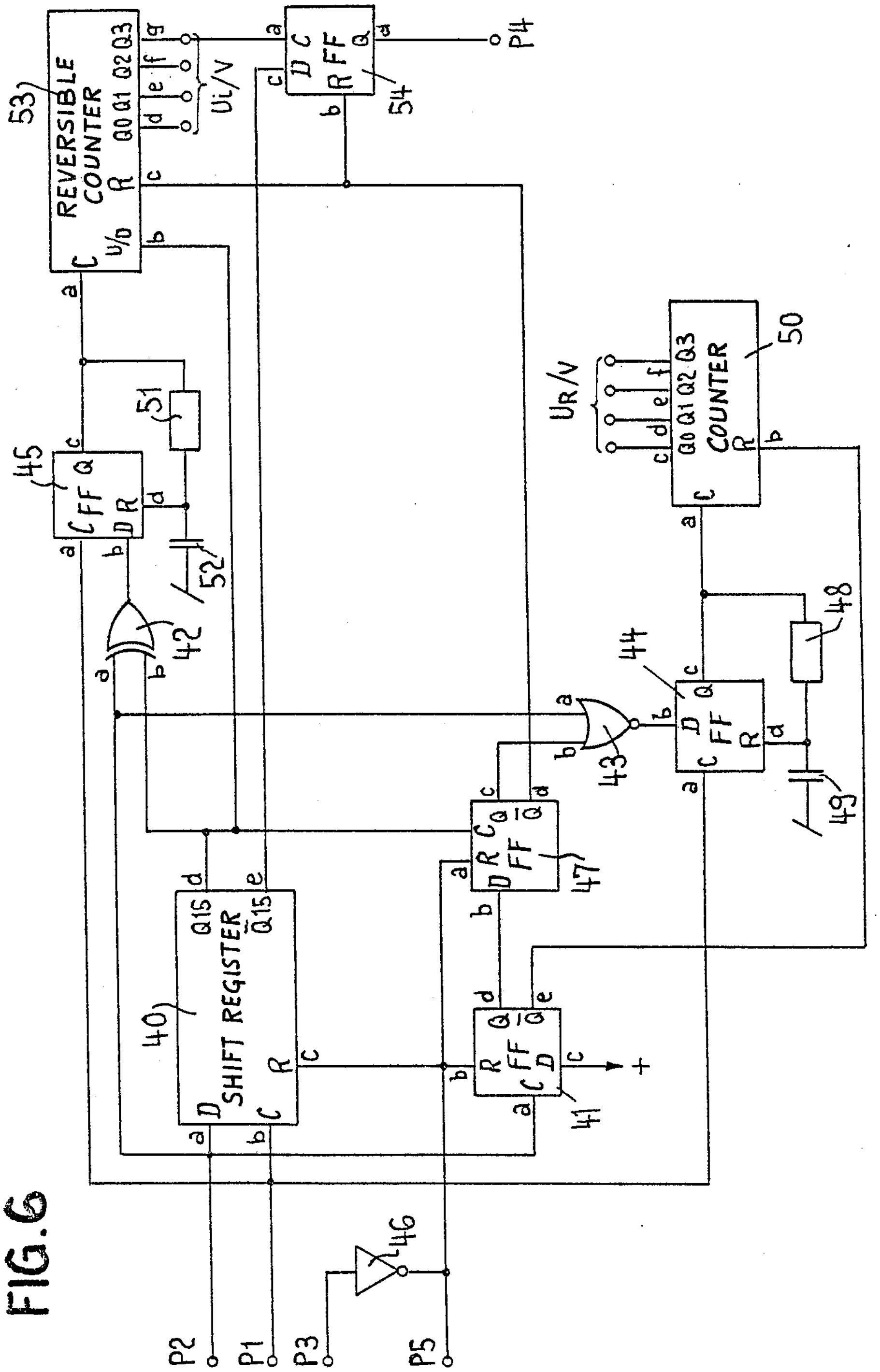
FIG. 6 shows the block diagram of a circuit for analysing the control signal produced by the circuit shown in FIG. 4.

FIG. 6 shows by way of example the block diagram of a circuit for analysing the succession of logic states supplied by the circuit shown in FIG. 4, which circuit makes it possible to determine the ratios Ui/V and $U_R$/V. This circuit is connected to the control circuit in FIG. 4 by points P1 (test pulses), P2 (test), P3 (motor control pulses) and P4 (end of motor control pulses).

Point P2 which corresponds to the output of the level discriminator and to the D input (a) of the flip-flop 35 is connected to the D input (a) of a 16-stage shift register 40, to the clock input of a D-type flip-flop 41 and to the inputs a of an EXCLUSIVE-OR gate 42 and a NOR-gate 43. The point P1 which supplies fine pulses with a duration of 2 μs at a frequency of 32 kHz at the clock input b of the flip-flop 35 is connected to the clock input b of the register 40 and to the clock inputs a of two D-type flip-flops 44 and 45.

Point P3 which corresponds to the output of the gate 20 at which a positive pulse, supplied either by the flip-flop 15 or by the flip-flop 16, appears for each motor control pulses, is connected to the input of an inverter 46, the output of which is connected to the inputs c of the register 40, b of the D-type flip-flop 41 and a of another D-type flip-flop 47. Register 40 and flip-flops 41 and 47 are therefore operational only during the duration (maximum of 16 ms) of the motor control pulses as they are maintained at state "0" between those pulses.

The first stage of the register 40 is connected in parallel with the flip-flop 35 and has at its $\overline{Q}$ output, like the flip-flop 35, the succession of logic states representing the ratio $(U_R+Ui)/V=n^+/n$.

That succession of states is transmitted with a delay period at the $\overline{Q}$ output of the second stage of the register 40, with two delay periods at the $\overline{Q}$ output of the third stage, etc, and with 15 delay periods at the $\overline{Q}$ output (e) of the 16th stage of the register 40. The register 40 thus permanently memorises (stores) the last 16 periods of the succession of logic states, namely a duration of 0.5 ms. The ratio $n^+/n$, that is to say ($U_R$+Ui)/V, is given by the ratio between the number of stages of the register 40 whose $\overline{Q}$ outputs are at state "1" and the total number of stages (the total number n of stages is of course constant and equal to 16).

It is obviously useful to be able to isolate $U_R$/V and Ui/V. It is known that $U_R$ becomes constant as soon as the current in the coil reaches the reference value Io. The parameters of the coil are so selected that this establishment time is short so that it is possible to measure the ratio ($U_R$+Ui)/V at the beginning of the motor control pulse, that is to say, near the point A in FIG. 5*b*. Indeed, at the moment the speed of the rotor is low and the induced voltage is close to zero. The ratio $U_R$/V is therefore approximately equal to the number of stages of the register 40 whose $\overline{Q}$ outputs are at state "1" in the first representative group of the memorised states of 16 periods. The beginning of this first group corresponds to the moment where the current in the coil reaches the reference value Io, that is to say, as soon as the test input P2 goes to state "1" for the first time and the $\overline{Q}$ output of the first stage of the register goes to "0". The end of the first groups of 16 periods corresponds to the moment at which the state "0" at the $\overline{Q}$ output of the first stage arrives at the last stage of the register, that is to say, when the $\overline{Q}$ 15 output (e) of the register 40 in turn goes to state "0" for the first time, the Q 15 output (d) going to state "1". The beginning and the end of the first representative group of 16 periods are registered respectively by the flip-flop 41 whose output Q goes to state "1" as soon as the input P2 goes to state "1" and the flip-flop 47, whose D input (b) is connected to the Q output (d) of the flip-flop 41, and whose output Q goes to state "1" as soon as the Q 15 output (d) of the register 40 goes to state "1". The Q output (c) of the flip-flop 47 is connected to the input b of the NOR-gate 43, the other input a of which is connected to the input P2. The output of gate 43 is connected to the D input (b) of the flip-flop 44 which is connected in a monostable configuration, the Q output (c) thereof being connected through a resistor 48 to its reset input (d) and to a capacitor 49 which is connected to ground.

At the beginning of the driving pulse, the Q output (c) of the flip-flop 47 is at state "0". The output of the gate 43, that is to say, the input b of the flip-flop 44, goes to state "1" whenever the input P2 goes to "0". The "test pulses" on P1 are simultaneously applied to the clock inputs of the flip-flop 44 and the register 40, so that the Q output (c) of the flip-flop 44 goes to state "1" whenever the first stage of the register 40 registers a state "1" at its $\overline{Q}$ output. The output c of the flip-flop 44 returns to state "0" as soon as the resistor 48 has charged the capacitor 49 and actuated the reset input. The output c of the flip-flop 44 therefore supplies a pulse to the clock input a of a counter 50 for each state "1" of the succession of logic states supplied by the control circuit of FIG. 4.

The reset input R (b) of the counter 50 is connected to the $\overline{Q}$ output (e) of the flip-flop 41 which goes to state "0" at the beginning of the first representative group of 16 periods, so that the counter 50 is maintained at 0 up to the beginning of this first group. At the end of the first group of 16 periods, the flip-flop 47 goes to state "1", thereby blocking the D input (b) of the flip-flop 44 at state "0", the flip-flop 44 then stops the delivery of pulses at its output. Thus, the counter 50, starting from 0, counts and memorises the number of states "1" which occur in the first representative group of 16 periods. Its state, as represented by the binary combination present at the outputs Q0 (c), Q1 (d) Q2 (e) and Q3 (f), is equal to the ratio $U_R/V$.

As soon as the first group of 16 periods corresponding to the value of the ratio $U_R/V$ has been registered in the register 40, that is to say, as soon as the Q 15 output (d) thereof goes to state "1", it is possible to calculate Ui/V by analysing the variations in the ratio n+/n, that is to say, the variations in the number of states "1" at the $\overline{Q}$ outputs of the 16 stages of the register 40. In fact, $U_R$ is then constant and those variations can only be produced by the induced voltage Ui which, as we have seen, is virtually zero at the beginning of the pulse. It is easy to ascertain whether the number of states "1" contained in the register increases, falls or remains stable.

If a "1" is introduced into the register and a "0" is taken out, the number of states "1" increases by one unit. On the other hand, if a "0" is introduced and a "1" is taken out, the number of states "1" falls by one unit. If a "1" is introduced and a "1" is taken out, the number of states "1" remains stable, and likewise if a "0" is introduced and a "0" is taken out.

The Q15 output (d) of the register 40 is connected to the input b of an EXCLUSIVE-OR gate 42, the output of which is connected to the D input (b) of the flip-flop 45 which is connected in a monostable configuration, its Q output (c) being connected to its reset input (d) by a resistor 51 which is also connected to a capacitor 52, the second terminal of which is connected to ground. The D input of the flip-flop 45 is at state "1" whenever the input P2 and the Q15 output of the register are at different states, that is to say, whenever the number of states "1" in the register is to change. In fact, when the input P2 is at state "0" and the output Q15 of the register is at state "1", just before the test pulse P1, that means that a "1" is going to be introduced into the first stage ($\overline{Q}$ output) and a "0" is going to be taken out of the last stage ($\overline{Q15}$ output) of the register. The number of states "1" is therefore going to be increased by one unit, and inversely when the input P2 is at state "1" and the Q15 output of register 40 is at state "0".

In both these cases, the flip-flop 45 goes to state "1" at the next test pulse on P2 and supplies a pulse to the clock input a of a reversible counter 53. The counter 53 therefore receives a pulse whenever the number of states "1" contained in the register 40 is increased or reduced by one unit. The direction of counting of the counter 53 is determined by the state of the counting direction input U/D (b) which is connected to the Q15 output (d) of the register 40. The counter 53 is incremented by one unit when the Q15 output is at state "1", that is to say, when the number of states "1" in the register increases by one unit, and inversely it is decremented by one unit when the Q15 output of the register is at state "0", that is to say, when the number of states "1" in the register falls by one unit. It should be recalled that it is the states of the $\overline{Q}$ outputs of the stages of the register 40 which are taken into account to form the succession of logic states representing the ratio $(U_R+Ui)/V$. In fact, at the beginning of the motor control pulse, it is necessary to have only states "1" in the register, and this is attained by actuating the resetting means and taking the $\overline{Q}$ outputs into account.

When P2 and the Q15 output of the register 40 are in the same state, the D input (b) of the flip-flop 45 is at state "0" and it therefore cannot supply any clock pulse to the counter 53. The reset input c of the counter 53 is connected to the $\overline{Q}$ output (d) of the flip-flop 47 which goes to state "0" at the end of the first representative group of 16 periods, that is to say, when $U_R/V$ has been stored in the counter 50. The counter 53 therefore starts from 0 at the end of the first group of 16 periods and its state, represented by the binary combination at its outputs Q0, Q1 Q2 and Q3 (d, e, f, g), is equal to the ratio Ui/V.

We have therefore extracted from the succession of logic states the values of $U_R/V$ and Ui/V represented in coherent binary form. It is obviously of interest to be able to use such data.

For example, it is useful, by analysing the induced voltage Ui, to determine when the rotor has performed its step movement in order to interrupt, for example, the motor control pulse(power saving) or to actuate the motor at a rapid rate (self-triggered register). It is also possible to determine if the rotor of the motor is blocked (induced voltage zero) or to control the power which is to be transmitted by the motor (monitoring the integral $\int$UiIodt).

Figure 5B:
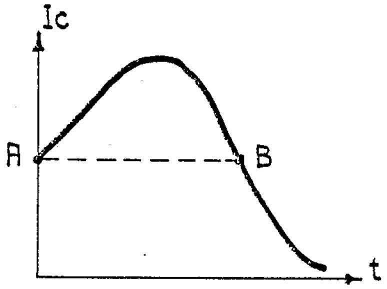

If the voltage induced (FIG. 3) by the movement of the rotor is analysed, it will be seen that it increases in a first phase and then returns to 0 (point B in FIG. 5*b*). With that return to 0, it is virtually certain that the rotor has performed its step movement and it is possible, for example, to interrupt the control pulse. The passage through 0 is easy to detect by means of a D-type flip-flop 54 whose clock input a is connected to the Q3 output (g) of the counter 53. The reset input (b) is connected to the $\overline{Q}$ output (d) of the flip-flop 47 and the D input (c) is connected to the $\overline{Q15}$ output (e) of the register 40.

Thus, when the counter 53 goes from 0 to 15 (obviously, in the downward mode), the Q15 output (d) of the register 40 is at "0" and the $\overline{Q15}$ output is at "1", the flip-flop 54 goes to state "1". The Q output (d) of the flip-flop 54 is connected to the pulse end input P4, that is to say, to the input b of the gate 18 (FIG. 4) which acts on the reset terminals of the flip-flops 15 and 16 so as to interrupt the control pulse before the maximum duration of 16 ms.

The possibility of using the integral ∫Ui.Io.dt to determine the power transmitted by the motor to the load has already been referred to above. As the current is constant, that integral is proportional to ∫Ui.dt.

In the circuit according to the invention, it is possible to integrate either Ui/V which remains dependent on the variations in the supply voltage V, or $Ui/U_R$=Ui/IoRb in which Io and Rb can be considered as constant. That integral can be determined by conventional computing circuits of counters, as shown in FIG. 7.

Figure 7:
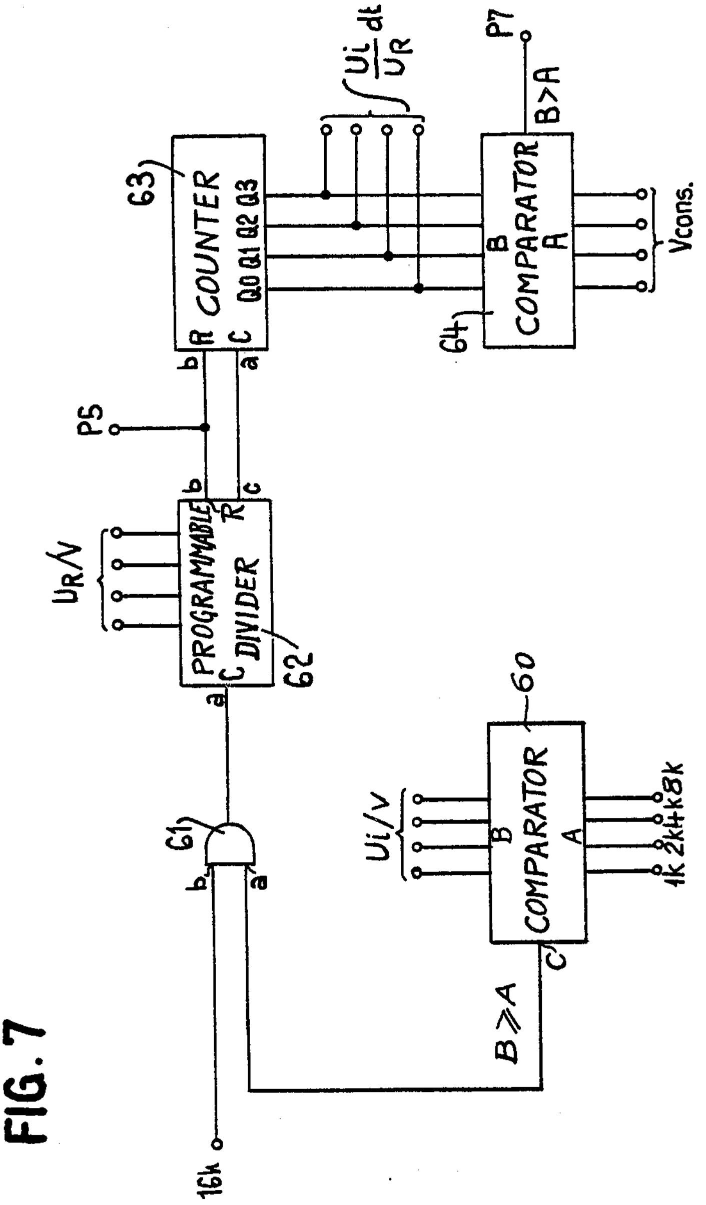
FIG. 7 shows the block diagram of a circuit for calculating the power consumed by the motor.

The circuit of FIG. 7 comprises a logic comparator 60 which receives at its inputs A, the 1 kHz, 2 kHz, 4 kHz and 8 kHz output signals of the divider 11 shown in FIG. 4, while it receives at its inputs B the output signals Q0, Q1, Q2 and Q3 of the counter 53 shown in FIG. 6, at which outputs the digital signal represents the value of the ratio Ui/V.

The signal A comprises a succession of 16 logic states, 0000 to 1111, each of 4 bits, with a period of 1 ms imposed by the 1 kHz signal. The signal B which is proportional to the voltage Ui induced in the coil during a step movement, that is to say, during a control pulse (maximum duration 16 ms) can be considered as constant during the 1 ms period of the signal A. Under these conditions, and starting from state 0000 of signal A, the comparator 60 supplies 8 kHz pulses at its output each millisecond, and this is for as long as the binary value of the signal B exceeds the binary value of the signal A. In other words, the number of 8 kHz pulses supplied each millisecond by the output of the comparator 60 is equal to Ui/V.

The output of the comparator 60 is connected to the input a of an AND-gate 61, the input b of which is connected to the 16 kHz output of the divider 11 in FIG. 4. Therefore, each millisecond, the gate 61 delivers at its output a number of periods of the 16 kHz signal, equal to the value of Ui. That output is connected to the clock input a of a programmable divider 62 whose reset input b is connected to point P5 (reset) in FIG. 6, so that the divider 62 operates only during the duration (maximum of 16 ms) of the motor control pulses. The programming inputs of the divider 62 are connected to the outputs Q0, Q1, Q2 and Q3 of the counter 50 shown in FIG. 6, representing the value of $U_R$/V, so that the division ratio of the divider 62 is equal to the ratio $U_R$/V.

The number of signals supplied at the output c of the divider 62 is therefore equal to the number of signals at its input, divided by the division ratio, namely $$t \cdot \frac{Ui}{V} : \frac{U_R}{V} = t\,\frac{Ui}{U_R} \qquad (9)$$

Wherein:

t=the number of milliseconds after the beginning of the control pulse,

Ui/V=number of signals delivered at the output of the gate 61 each millisecond, and $U_R$/V=division ratio of the divider 62.

It will be seen that the number of signals delivered at the output of the divider 62 is representative of the integral ∫ Ui.dt. In order to ascertain that value, the output (c) of the divider 62 is connected to the clock input a of a counter 63, the reset input b of which is connected to point P5 in FIG. 6. The counter 63 starts from 0 at the beginning of the motor control pulse and the content thereof, as represented by the states of its outputs Q0 to Q3, is representative of the integral ∫ Ui.dt, that value being proportional to the energy received and delivered by the motor.

The content of the counter 63 can itself be compared to a reference value, by means of a comparator 64. For that purpose, the outputs of the counter 63 are connected to the inputs B of a comparator 64 whose inputs A receive the reference value. The output B>A of the comparator 64 can then be used for example to interrupt the motor control pulse.

When the reference value is not reached during the duration of the motor control pulse, there may be the fear that the rotor has not performed its step movement, and an additional driving pulse, at a high energy level, can be supplied to ensure movement of the rotor.

There are of course many other combinations for analysing the succession of logic states supplied by the motor control circuit (FIG. 4) and the values of Ui, $U_R$ or ∫ Ui.dt which derive from analysis of that succession make it possible, by measuring the time of movement of the rotor or the effective energy received by the motor, to adapt by means of suitable monitoring or control circuits the duration of the control pulses to the load on the motor, to detect step movements which have not been carried out, or to actuate the motor at high speed.

In general, such monitoring circuits cannot be dissociated from the control circuit. Thus, in a watch, the control circuits shown in FIG. 4 and the monitoring circuits shown in FIGS. 6 and 7 would be incorporated into the integrated circuit of the watch, for which reason such monitoring circuits must be relatively simple and inexpensive.

Figure 8:
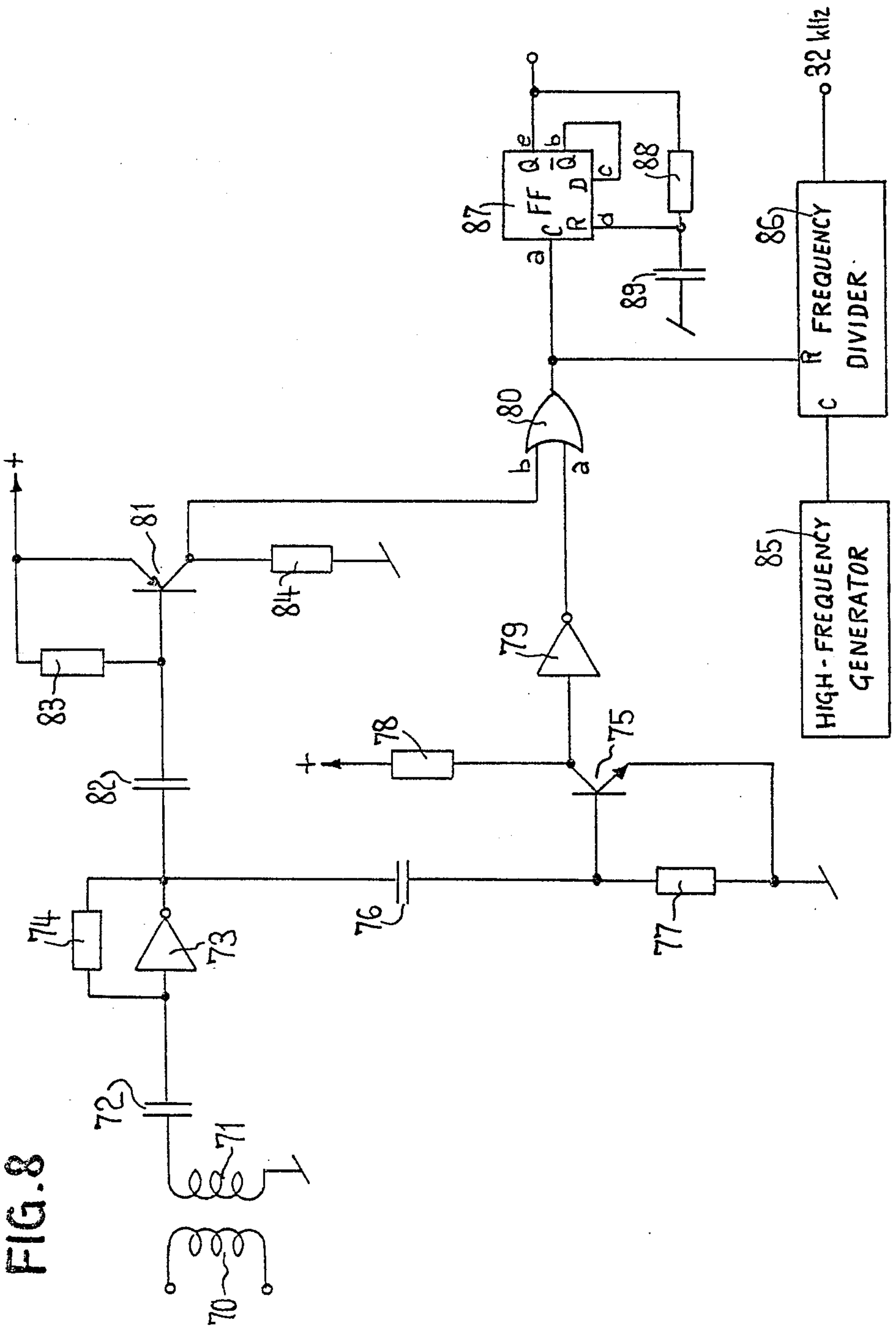
FIG. 8 shows the diagram of an external circuit for reconstituting the control signal produced by the circuit shown in FIG. 4.

On the other hand, in the course of manufacture or repair, it may be desirable to make more accurate measurements by means of more highly developed circuits which can be incorporated into a measuring apparatus which is external to the watch, that apparatus making it possible to measure certain parameters relating to operation of the stepping motor by analysing the succession of logic states supplied by the motor control circuit. Now, that succession of logic states is directly present at the terminals of the motor. It is therefore only necessary to connect a probe to one or other of the terminals of the motor in order to introduce the succession of logic states into the measuring apparatus. The apparatus must then comprise analysis means similar to those of the circuits shown in FIGS. 6 and 7, for extracting the values of Ui, $U_R$ or ∫ ui.dt. In fact, this only involves an extension of the device according to the invention, with a part of the device, then being disposed in the watch and with the other part in the external measuring apparatus. Connecting means for connecting between those two parts must also be provided, such connecting means making it possible to reconstitute and analyse in the second part the succession of logic states generated by the first part. When a probe is used, such means are reduced to a simple input amplifier. FIG. 8 shows a second embodiment of a device using a detector or pick-up coil for detecting the signals emitted by the motor coil and for reconstituting, by means thereof, the succession of logic states produced by the circuit. This makes it possible for example to check a watch which has already been fitted into its case and the motor terminals of which are inaccessible.

In any case, that is to say, whether the coupling action is inductive or galvanic, it is also necessary to provide a secondary generator which is synchronised by the signals detected at the motor, which generator supplies the reference or clock signals required for correctly analysing the succession of logic states. FIG. 8 shows the coil 70 of the motor and also the detector coil 71 of the device. The on/off signals, with very steep edges, of the succession of logic states to be reconstituted, occur on the motor coil 70 (emitter coil). The steep edges can be detected by differentiating the signal detected by the coil 71, by means of a capacitor 72 connected to the input of an inverting amplifier 73, and a resistor 74 connected between the capacitor 72 and the output of the amplifier 73. Positive or negative pulses appear at the output of the amplifier 73. The polarity of those pulses depends on the direction of the current in the motor coil and the position of the detector coil with respect to the coil of the motor. It is therefore not possible to ascertain that a positive pulse corresponds to the establishment of the current in the coil and inversely.

The positive pulses at the output of the amplifier 73 are amplified by a transistor 75 of NPN type, the base of which is connected to the output of the amplifier 73 by a capacitor 76 and to earth by a resistor 77. The collector of the transistor 75 is connected to the positive terminal of the power supply by a resistor 78 and to the input of an inverter 79. For any positive pulse of more than 0.7 volt (threshold voltage of the transistor 75) at the output of the amplifier 73, the transistor 75 becomes conducting and produces a negative pulse at its collector to the input of the inverter 79. The output of the inverter 79 supplies a positive pulse to the input a of an OR-gate 80, the output of which also supplies a positive pulse. The negative pulses at the output of the amplifier 73 are amplified by a transistor 81 of PNP type the base of which is connected to the output of the amplifier 73 by a capacitor 82 and to the positive terminal of the power supply by a resistor 83. The collector of the transistor 81 is connected to earth (negative terminal of the power supply) by a resistor 84 and to the input b of the OR-gate 80.

For any negative pulse of more than 0.7 volt at the output of the amplifier 73, the transistor 81 conducts and produces a positive pulse at its collector, the output of the gate 80 also supplying a positive pulse. This circuit provides, as it were, for "rectifying" the pulses supplied by the amplifier 73, the output of the gate 80 supplying a positive pulse for each pulse at the output of the amplifier 73, irrespective of the polarity thereof. Those pulses make it possible to synchronise an internal generator which in this case comprises a high-frequency (4 MHz) generator 85 and a divider 86 which supplies inter alia a signal at 32768 MHz, which is synchronized with the internal generator of the watch, because the output of the gate 80 is simply connected to the reset input of the divider 86. The output of the gate 80 is also connected to the clock input a of a D-type flip-flop 87 operating as a binary divider dividing by 2, the output $\overline{Q}$ thereof being connected to its D input (c).

It is known that, in the coil of the motor, the times for which power is supplied to the coil are necessarily followed by short-circuit phases, and likewise in a divider for dividing by two, states "1" are necessarily followed by states "0". It is therefore only necessary to synchronise the signals at the terminals of the coil 70 and at the output of the flip-flop 87 in order for state "1" at the output of the latter to correspond to the state of supply to the motor coil and for state "0" to correspond to the coil short-circuited state. It is also known that the motor control pulses are of short duration (2 μs) with respect to their repetition period (30 μs). Accordingly, the duration for which power is supplied to the coil is on average much shorter than the duration for which it is short-circuited, while the short-circuit is also maintained between two motor control pulses. In order to synchronise the Q output (e) of the flip-flop 87, that output only has to be connected by way of a high-value resistor 88 to the reset input (d) of the same flip-flop, the latter being connected to earth through a high-value capacitor 89. The RC circuit 88, 89 supplies at the terminals of the capacitor 89 the mean value of the voltage at the Q output of the flip-flop 87. If that mean voltage is too high, this means that the states "1" are more numerous than states "0" and the output signal of the flip-flop 87 is out of phase. The high voltage at the reset input of the flip-flop 87 then causes the flip-flop to switch over, thereby re-establishing the correct phase relationship.

Thus, the outputs of the flip-flop 87 and the divider 86 respectively provide the suitably reconstituted succession of logic states which is delivered by the control circuit, and the suitably synchronised clock signals. That succession of logic states and those signals then make it possible to use analysis circuits such as those described with reference to FIGS. 6 and 7. Those circuits make it possible inter alia to ascertain the values of Ui/V and $U_R$/V.

By introducing the values of V and Rb (supply voltage and resistance of the motor coil), it is possible to calculate the values of $I_o=(U_R/V).(V/Rb)=U_R/Rb$ and the current consumed by the motor, $I_c=I_o[(U_i/V)+(U_R/V)]$ and also the electrical energy which is actually received by the motor, $$w = \int Ui \cdot Io \cdot dt = Io \cdot V \int \frac{Ui}{V} \cdot dt.$$

All those values can therefore be easily measured by connecting a probe or pick-up to a terminal of the motor, or better, by placing the latter on a detector or pick-up means comprising a suitable detector coil.

Figure 9:
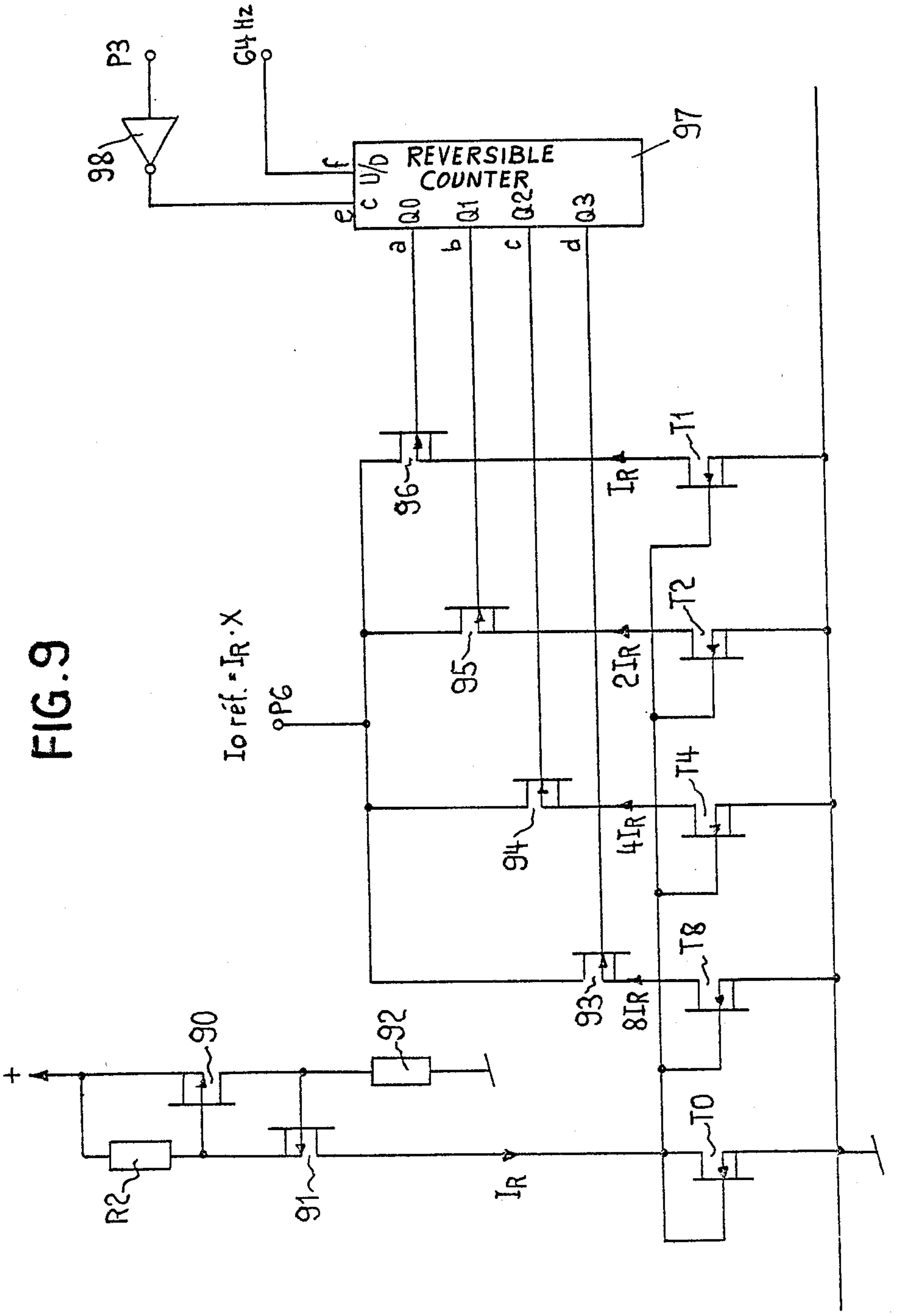
FIG. 9 shows the diagram of a circuit for programming the reference current which determines the trigger level of the level discriminator shown in FIG. 4.

A last interesting aspect of the device according to the invention is shown in FIG. 9. This involves the possibility of programming as desired the reference current Ip which fixes the level of triggering of the discriminator for the level of current in the motor coil. This can be easily done by replacing the resistor R1 in FIG. 4 by a programmable current source as shown in FIG. 9.

This device comprises a circuit producing a reference current formed by transistors 90 ans 91 of P-MOS type. The source of the transistor 90 is connected to the positive terminal of the power supply; its drain is connected to earth through a high-value resistor 92 and to the gate of the transistor 91; its gate is connected to the positive terminal of the power supply by a resistor R2 and to the source of the transistor 91. The drain of the transistor 91 is connected to the gate and the drain of a transistor To of N-MOS type, the source of which is connected to earth. The P-type transistors 90 and 91 form a regulator for maintaining the voltage at the terminals of the resistor R2 equal to the threshold voltage $V_T$ of the transistor 90.

In fact, if the voltage at the terminals of the resistor R2 increases, the current in the transistor 90 also rises, the voltage drop in the resistor 92 increases, and the current in the transistor 91 falls, which reduces the voltage at the terminals of R2. The opposite process occurs if the voltage at the terminals of R2 falls, so that that voltage is stabilised at the value of the threshold voltage $V_T$ of the transistor 90. The reference current which is produced in this way is equal to $I_R = V_T/R2$. That current passes in its entirety through the transistor 91 and the transistor To, determining at the latter a gate-source reference voltage, for which the drain-source current of the transistor To is equal to $I_R$. The reference voltage at the terminals of the transistor To is applied between gate and source of four N-MOS-type transistors T1, T2, T4 and T8, which are of such a size as to produce between drain and source, currents which are proportional to $I_R$ and which increase in a geometrical progression.

Thus, the transistor T1 supplies a current $I_R$, the transistor T2 supplies a current 2 $I_R$, and the transistors T4 and T8 supply respective currents 4 $I_R$ and 8 $I_R$. The drain of the transistor T1 is connected to the source of an N-MOS type transistor 96, the gate of which is connected to the Q0 output (a) of a reversible counter 97. The drain of the N-MOS type transistor T2 is connected to the source of an N-MOS type transistor 95, the gate of which is connected to the Q1 output (b) of the counter 97. The drain of the N-MOS type transistor T4 is connected to the source of a transistors 94 of N-MOS type, the gate of which is connected to the Q2 output (c) of the counter 97 and the drain of the transistor T8 of N-MOS type is connected to the source of a N-MOS type transistors 93, the gate of which is connected to the Q3 output (d) of the counter 97. The drains of the NMOS type transistors 93 to 96 are connected together at a common point P6. The transistors 93, 94, 95 and 96 act as circuit breakers, allowing the currents supplied respectively by the transistors T8, T4, T2 and T1 to pass, when their gate is at state "1".

The current Io at the common point P6 is the sum of the individual currents, the value thereof depending on the logic states at the outputs Q0 to Q3 of the reversible counter 97. It will be seen that, if the counter 97 is at 0, the current Io is zero, with the transistors 93, 94, 95 and 96 all being in a non-conducting condition. On the other hand, if the content of the counter 97 is at the maximum (1111), the transistors 93 to 96 are all conducting and the current Io at P6 assumes the value:

$$Io = I_R + 2I_R + 4I_R + 8I_R = 15I_R.$$

The value of the current at point P6 therefore depends on the content of the counter 97, in accordance with the relationship $Io = xI_R$ wherein x is the content of the counter.

The circuit shown in FIG. 9 is therefore indeed a programmable current source. Therefore, by replacing the resistor R1 in FIG. 4 by this current source, it is possible at will to program the level of the current in the motor coil. It will be appreciated that the gates of the transistors 92 to 96 could also be connected to the outputs of any type of memory (ROM, RAM, EPROM, etc.)

In the circuit shown in FIG. 9, the counter 97 was used to show that programming of the current Io can be used in a supplementary control system which makes it possible precisely to determine the number of ampere-turns required for the rotor of the motor to perform its step movement in a given time.

For that purpose, the clock input e of the counter 97 is connected to the output of an inverting amplifer 98, the input of which receives the motor control pulses at P3 in FIG. 4, the counting direction control input U/D (f) of the counter 97 receiving a 64 Hz signal from the divider 11 in FIG. 4. It will be assumed hereinafter that the system comprises the circuit of FIG. 6, for interrupting the motor control pulse when the step movement has been carried out. The duration of the control pulse is therefore variable and it represents the time required for the rotor to perform its step motion.

If the torque required is low, that time will be of short duration. If the torque required is high, that time will be longer. Let us assume that we are faced with the former situation, and that the duration of the control pulse is 6 ms.

The 64 Hz signal at the U/D input goes to state "1" after 8 ms, the counter 97 changes at the end of the motor control pulse at its clock input, that is to say, when the U/D input is still at state "0". The counter then counts down one step, the counter content falling by one unit, and likewise for the current Io. At the next control pulse, the number of ampere-turns (NIo, wherein N=number of turns on the motor coil) received by the motor will be lower, so that the rotor will require a longer period of time to perform its stepping movement, for example 7 ms. At the end of the control pulse, the U/D input is still at state "0" and the counter counts down a further step, so that the current Io falls by another unit. At the next control pulse, the rotor will therefore require even more time to perform its stepping movement, for example 8.5 ms. In that case, at the end of the control pulse, the U/D input goes to state "1". The counter therefore advances by one step and the current rises by one unit so that the duration of the next step will be reduced, with the number of ampere-turns and consequently the torque of the motor being increased. This therefore provides automatic stabilisation of the duration of the control pulse and consequently the time for movement of the rotor, at around 8 ms, and this also occurs in the event of variations in the load torque of the motor.

This combination of circuits enables the motor always to operate under optimum conditions, thereby to save an appreciable amount of energy. In fact, when the load on the motor is low, the number of ampere-turns is automatically reduced, which automatically reduces the starting torque. This therefore avoids imposing an excessively high degree of acceleration on the motor, with the energy expended for the latter being lost in any case.

It will be clear that the examples given in FIGS. 6, 7, 8 and 9 represent only some of the possible modes for analysis of the succession of logic states and for controlling operation of the motor by means of the device according to the invention.

I claim:

1. A control device for a stepping motor provided with a coil and a rotor performing a rotary movement when a current passes through the coil, comprising means for supplying a plurality of time base signals, means for producing pulses for controlling the motor in response to at least a part of said time base signals, means responsive to the control pulses for supplying the motor while maintaining the current in the coil at a substantially constant and given value during the control pulses, means for deriving a signal representative of the coil voltage signal, and analysis means for supplying, from the signal representative of the voltage signal, signal data concerning at least the voltage induced in the coil by the movement of the rotor.

2. A device according to claim 1 wherein said means for supplying the motor comprises switching means for connecting the coil to a supply voltage source and for short-circuiting said coil, and means for periodically comparing the current in the coil to a reference value during each control pulse and producing a control signal for controlling said switching means, thereby to short-circuit the coil when, in a comparison operation, the current exceeds the reference value, and to supply voltage to said coil if the current is below said value, until the following comparison operation, the mean value of said current being thus maintained at said reference value during said control pulses.

3. A device according to claim 2 wherein said reference value is determined by the threshold voltage of an MOS-transistor which is independent of the motor supply voltage.

4. A device according to claim 2 wherein said control signal comprises a succession of logic states "1" and "0" corresponding to the coil short-circuit and coil supply conditions.

5. A device according to claim 4 wherein said analysis means receives said control signal and comprises storage means for memorising, in response to said time base signals, the logic states of a given number of periods of said control signal, first counting means for counting, in response to said time base signals, the number of logic states corresponding to the condition of short-circuiting of the coil in a first group of stored logic states, said first counting means supplying at their outputs a digital signal representative of the ratio of the voltage due to the resistance of said coil to the supply voltage, and second counting means for counting, in response to said time base signals and at the end of said first group of logic states, the variations in the number of said logic states corresponding to the condition of short-circuiting of the coil and contained in said storage means, said second counting means supplying at their outputs a digital signal representative of the ratio of the voltage induced in the coil by the movement of the rotor to the supply voltage.

6. A device according to claim 5 wherein said first storage means comprises a shift register.

7. A device according to claim 5 wherein said second counting means comprises a reversible counter.

8. A device according to claim 5 further comprising means connected to said second counting means for producing a pulse end signal when the ratio of the induced voltage to the supply voltage is of a given value, and means for interrupting said control pulse in response to said pulse end signal.

9. A device according to claim 5 further comprising means for determining the power consumed by the motor during one stepping movement.

10. A device according to claim 9 wherein the means for determining the power consumed by the motor comprises first comparison means for comparing the ratio of the induced voltage to the supply voltage with a periodic digital signal formed by a logic combination of at least a part of said time base signals, said first comparison means producing an output signal when the value of said periodic digital signal is lower than the value of said ratio, frequency dividing means having a dividing ratio which is programmable by said ratio of the voltage due to the resistance of the coil to the supply voltage, said frequency dividing means producing in response to said time signal a number of signals representative of the power consumed by the motor, and third counting means for receiving the signals from said frequency dividing means and producing at its output a digital signal which is representative of the power consumed by the motor during each control pulse.

11. A device according to claim 10 further comprising second comparison means for comparing said digital signal representative of the power consumed with a reference valve, said second comparison means producing a pulse end signal when the value of said signal representative of the power consumed is higher than the reference value, said pulse end signal being operative to control the duration of the control pulses in dependence on the reference value.

12. A device according to claim 2 comprising means for programming said reference value.

13. A device according to claim 12 wherein said means for programming the reference value comprises a reference voltage source for controlling a group of transistors dimensioned so as to respectively supply currents which vary in a geometrical progression, each of said transistors being connected in series with a respective switching transistor having a control input and an output, the outputs of the switching transistors being connected to a common terminal and the control inputs of said switching transistors being respectively connected to outputs of storage means producing at said outputs a digital signal for determining the conducting or non-conducting state of said switching transistors so that the sum of the currents of said transistors of said group at said common terminal is representative of said digital signal and consequently programmed by said digital signal, said sum of the currents at said terminal being said common reference value.

14. A device according to claim 13 wherein said storage means comprises a reversible counter having a clock input to which said motor control pulses are applied, the duration of said pulses being adapted to vary in dependence on the load on the motor, and a counting direction control input receiving a time base signal of a period related to the time required for the rotor to perform a stepping movement, the output signal of said reversible counter and consequently the value of the reference current at said common terminal being dependent on the relative durations of the motor control pulse and said period of the time base signal, the duration of said control pulse being thus dependent on the value of the period of said time base signal and the power consumption being minimum, even when there are variations in the load.

15. A device according to claim 1 further comprising means coupled to said analysis means for producing a pulse end signal when said induced voltage is of a given value, and means for interrupting the supply of power to the motor in response to said pulse end signal.

16. A control device for a stepping motor provided with a coil and a rotor performing a rotary movement when a current passes through the coil, comprising means for supplying a plurality of time base signals, means for producing control pulses for controlling the motor in response to at least a part of said time base signals, switching means responsive to the control pulses to selectively connect the coil to a supply voltage source and to short-circuit said coil, and means for periodically comparing the current in the coil to a reference value during each control pulse and producing a control signal for controlling said switching means to short-circuit the coil when, in a comparison operation, the current exceeds the reference value, and to supply said coil with voltage if the current is below said value, until the following comparison operation, the mean value of said current thus being maintained at said reference value during said control pulses.

17. A device according to claim 16 wherein said reference value depends on the threshold voltage of an MOS transistor which is independent of the motor supply voltage.

18. A device according to claim 16 wherein said control signal is formed by a succession of logic states "1" and "0" corresponding to the coil voltage short-circuit and coil supply conditions.

19. A device according to claim 18 further comprising means for analysing said control signal during the motor control pulses and supplying at least one digital signal representative of the voltage induced in the coil by the movement of the rotor.

20. A device according to claim 19 wherein said means for analysing the control signal comprises storage means for storing, in response to said time base signals, the logic states of a given number of periods of said control signal, first counting means for counting, in response to said time base signals, the number of logic states corresponding to the condition of short-circuiting of the coil in a first group of stored logic states, said first counting means supplying at its outputs a digital signal representative of the ratio of the voltage due to the resistance of said coil to the supply voltage, and second counting means for counting, in response to said time base signal and at the end of said first group of logic states, the variations in the number of said logic states corresponding to the condition of short-circuiting of the coil and contained in said storage means, said second counting means supplying at its outputs a digital signal representative of the ratio of the voltage induced in the coil by the movement of the rotor to the supply voltage.

21. A device according to claim 20 wherein said first storage means comprises a shift register.

22. A device according to claim 20 wherein said second counting means comprises a reversible counter.

23. A device according to claim 20 further comprising means connected to said second counting means for producing a pulse end signal when the ratio of the induced voltage to the supply voltage is of a given value, and means for interrupting said control pulse in response to said pulse end signal.

24. A device according to claim 20 further comprising means for determining the power consumed by the motor during one stepping movement.

25. A device according to claim 24 wherein said means for determining the power consumed by the motor comprises first comparison means for comparing the ratio of the induced voltage to the supply voltage with a periodic digital signal formed by a logic combination of at least a part of said time base signals, said first comparison means producing an output signal when the value of said periodic digital signal is less than the value of said ratio, the duration of said output signal being representative of the value of said ratio, frequency divider means having a dividing ratio which is programmable by said ratio of the voltage due to the resistance of the coil to the supply voltage, said frequency divider means supplying in response to said output signal of said first comparison means and said time base signals a number of signals representative of the power consumed by the motor, third and counting means for receiving the signals of said frequency divider means and supplying at its outputs a digital signal which is representative of the power consumed by the motor during each control pulse.

26. A device according to claim 25 further comprising second comparison means for comparing said digital signal representative of the power consumed with a reference value, said second comparison means producing a pulse end signal when the value of said signal representative of the power consumed is higher than the reference value, said pulse end signal operative to control the duration of the control pulses in dependence on the reference value.

27. A device according to claim 16 comprising means for programming said reference value.

28. A device according to claim 27 wherein said means for programming the reference value comprises a reference voltage source for controlling a group of transistors dimensioned so as to respectively supply currents which vary in a geometrical progression, each of said transistors being connected in series with a respective switching transistor having a control input and an output, the outputs of the switching transistors being connected to a common terminal and the control inputs of said switching transistors being respectively connected to outputs of storage means producing at said outputs a digital signal for determining the conducting or non-conducting state of said switching transistors so that the sum of the currents of said transistors of said group at said common terminal is representative of said digital signal and consequently programmed by said digital signal, said sum of the currents at said common terminal being said reference value.

29. A device according to claim 28 wherein said storage means comprises a reversible counter having a clock input to which said motor control pulses are applied, the duration of said pulses being adapted to vary dependent on the load on the motor, and a counting direction control input receiving a time base signal of a period related to the time required for the rotor to perform a stepping movement, the output signal of said reversible counter and consequently the value of the reference current at said common terminal being dependent on the relative durations of the motor control pulse and said period of the time base signal, the duration of said control pulse being thus dependent on the value of the period of said time base signal and the power consuption being minimum, even when there are variations in the load.

30. A device as claimed in claim 16 for reconstituting the control signal comprising, means for detecting the signals in the motor coil, first shaping means for supplying at its output a positive pulse for each detected signal, means for producing time base signals which are synchronised by said output pulses, second shaping means and switching means for producing a succession of logic states representative of said control signal in response to said output pulses.

31. A device according to claim 30 wherein said detector means comprise a detector coil.

32. A device according to claim 30 wherein said means for producing time base signals comprises a high-frequency pulse generator coupled to a frequency divider for supplying said time base signals, the reset input of said divider being controlled by said output pulses thereby to provide said synchronisation.

33. A device according to claim 30 wherein said switching means comprises a flip-flop having an output connected to its reset input via a high-value resistor, the reset input being connected to a terminal of the supply voltage by a high-value capacitor.

* * * * *

UNITED STATES PATENT AND TRADEMARK OFFICE
CERTIFICATE OF CORRECTION

PATENT NO. : 4,439,717

DATED : March 27, 1984

INVENTOR(S) : JEAN-CLAUDE BERNEY

It is certified that error appears in the above-identified patent and that said Letters Patent is hereby corrected as shown below:

IN THE ABSTRACT, line 6, before "means" insert --and--.

IN THE SPECIFICATION:

Column 1, line 13, delete "producing";
lines 24 and 25, delete "," (comma);
line 25, delete "in partic";
line 26, delete "ular";
line 27, delete "and";
line 28, change "which " to --that--;
line 46, delete "," (first occurrence);
line 51, change "for operation of the" to --to operate a--;
delete "to be";
line 52, change "rendered independent" to --independently--;
line 65, change "taking off" to --deriving--;
line 66, before "voltage" insert --coil--;
delete "present on the";
line 67, delete "coil";
line 68, before "data" insert --signal--.

On thd title page, "33 Claims" should read -- 35 Claims --.

UNITED STATES PATENT AND TRADEMARK OFFICE
CERTIFICATE OF CORRECTION

PATENT NO. : 4,439,717

DATED : March 27, 1984

INVENTOR(S) : JEAN-CLAUDE BERNEY

It is certified that error appears in the above-identified patent and that said Letters Patent is hereby corrected as shown below:

IN THE SPECIFICATION:

Column 2, lines 24, 47 & 53, delete "," (comma);
line 28, change "uses" to --devices--;
delete "in" (second occurrence);
line 48, change "for controlling" to -- . This control signal controls--.

Column 3, line 30, delete "," (comma);
line 31, delete "respectively";
lines 58 & 64, change "those" to --these--.

Column 4, line 63, delete "coil";
line 64, delete "of the" (first occurrence);
after "motor" insert --coil--.

Column 7, line 40, change "same" to --similar--;
line 64, change "; the" to -- . The--.

Column 8, line 68, change "groups" to --group--.

UNITED STATES PATENT AND TRADEMARK OFFICE

CERTIFICATE OF CORRECTION

PATENT NO. : 4,439,717

DATED : March 27, 1984

INVENTOR(S) : JEAN-CLAUDE BERNEY

It is certified that error appears in the above-identified patent and that said Letters Patent is hereby corrected as shown below:

IN THE SPECIFICATION:

Column 10, line 39, delete "," (comma);
line 52, after "Q1" insert --,-- (comma).

Column 11, line 29, delete "of counters";
line 56, delete "," (comma).

Column 12, Formula (9) change ": $\frac{U_R}{V}$ " to -- $\div \frac{U_R}{V}$ --;
line 24, delete "," (comma);
line 62, after "or" insert --the--;
line 66, delete "," (comma).

Column 13, lines 1 & 27, delete "," (comma);
lines 41 & 56, change "earth" to --ground--;
line 47, change "produces" to --supplies--;
line 52, after "type" insert --,-- (comma).

Column 14, line 3, delete "," (comma);
line 28, change "earth" to --ground--.

UNITED STATES PATENT AND TRADEMARK OFFICE

CERTIFICATE OF CORRECTION

PATENT NO. : 4,439,717

DATED : March 27, 1984

INVENTOR(S) : JEAN-CLAUDE BERNEY

It is certified that error appears in the above-identified patent and that said Letters Patent is hereby corrected as shown below:

IN THE SPECIFICATION:

Column 15, line 2, change "ans" to --and--;
lines 5 & 11, change "earth" to --ground--;
line 31, delete "," (comma);
lines 44 & 48, change "transistors" to --transistor--;
line 54, delete "," (comma).

Column 16, line 14, change "precisely to determine" to --to determine precisely--;
line 23, delete "," (comma);
lines 42 & 46, delete "," (comma).

IN THE CLAIMS:

Claim 1, line 13, before "voltage" insert --coil--.

Claim 3, line 3, change "which is" to --and is thereby--.

UNITED STATES PATENT AND TRADEMARK OFFICE
CERTIFICATE OF CORRECTION

PATENT NO. : 4,439,717

DATED : March 24, 1984

INVENTOR(S) : JEAN-CLAUDE BERNEY

It is certified that error appears in the above-identified patent and that said Letters Patent is hereby corrected as shown below:

IN THE CLAIMS:

Claim 5, lines 9 & 17, change "their" to --its--.

Claim 6, line 1, cancel "first".

Claim 10, line 13, after "said" insert --output signal of the first comparison means and said--; after "time" insert --base--.

Claim 25, line 17, change "third and " to --and third--.

Claim 29, line 14, change "and" to --whereby--;
line 15, change "being" to --is--;
change ", even when there are" to --despite--.

UNITED STATES PATENT AND TRADEMARK OFFICE
CERTIFICATE OF CORRECTION

PATENT NO. : 4,439,717

DATED : March 24, 1984

INVENTOR(S) : JEAN-CLAUDE BERNEY

It is certified that error appears in the above-identified patent and that said Letters Patent is hereby corrected as shown below:

Add the following claims:

--34. A device according to claim 20 further comprising means responsive to the digital signals at the outputs of the first and second counting means for determining the power consumed by the motor during one stepping movement thereof.

35. A device according to claim 16 further comprising means responsive to the motor control pulses for programming said reference value.--

Signed and Sealed this

Third Day of March, 1987

*Attest:*

DONALD J. QUIGG

*Attesting Officer*

*Commissioner of Patents and Trademarks*

UNITED STATES PATENT AND TRADEMARK OFFICE

CERTIFICATE OF CORRECTION

PATENT NO. : 4,439,717

DATED : March 27, 1984

INVENTOR(S) : JEAN-CLAUDE BERNEY

It is certified that error appears in the above-identified patent and that said Letters Patent is hereby corrected as shown below:

In the Claims:

Claim 18, line 3, after "coil" delete --voltage-- line 4, after "coil" insert --voltage--

Signed and Sealed this

Eighteenth Day of August, 1987

*Attest:*

DONALD J. QUIGG

*Attesting Officer*

*Commissioner of Patents and Trademarks*